Figure 1:
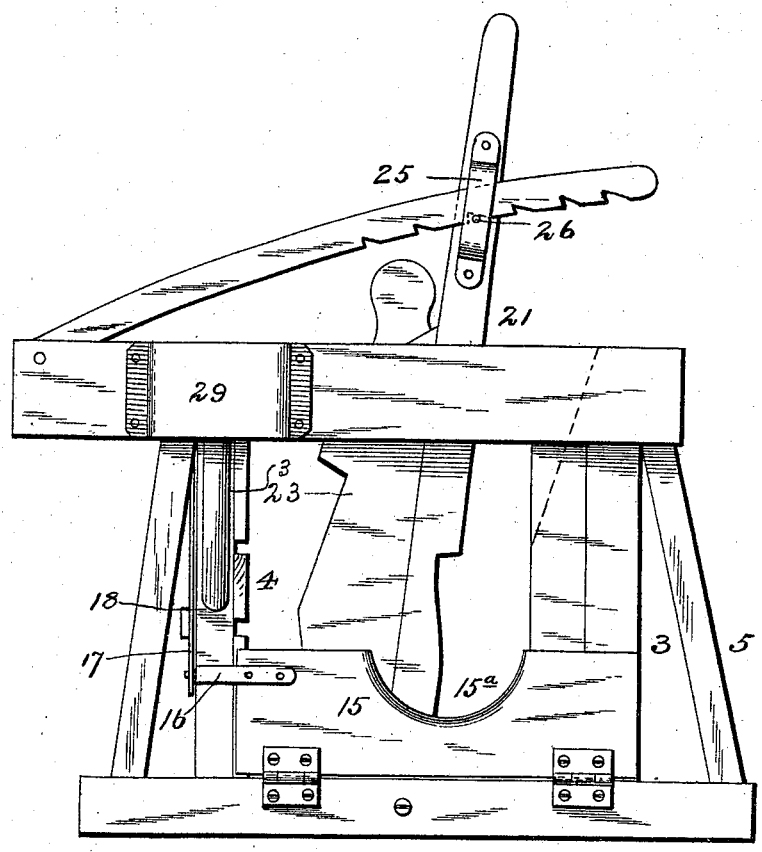

(No Model.) 2 Sheets—Sheet 1.
M. RUNNELLS & W. W. PRATT.
HOG RINGING TRAP.

No. 581,175. Patented Apr. 20, 1897.

(No Model.) 2 Sheets—Sheet 2.
M. RUNNELLS & W. W. PRATT.
HOG RINGING TRAP.
No. 581,175. Patented Apr. 20, 1897.
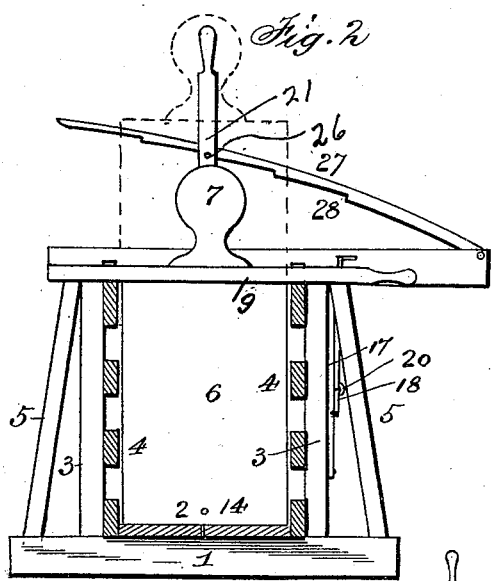
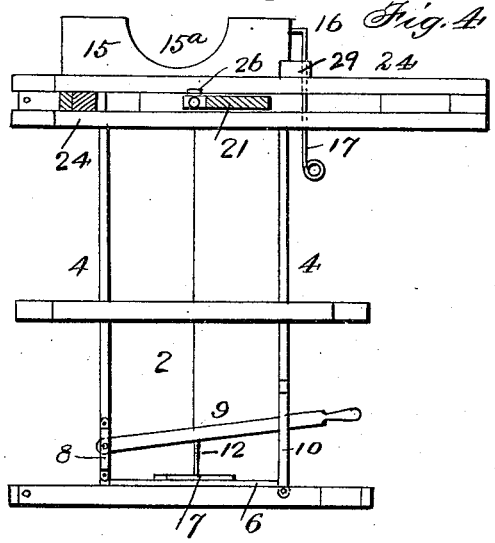
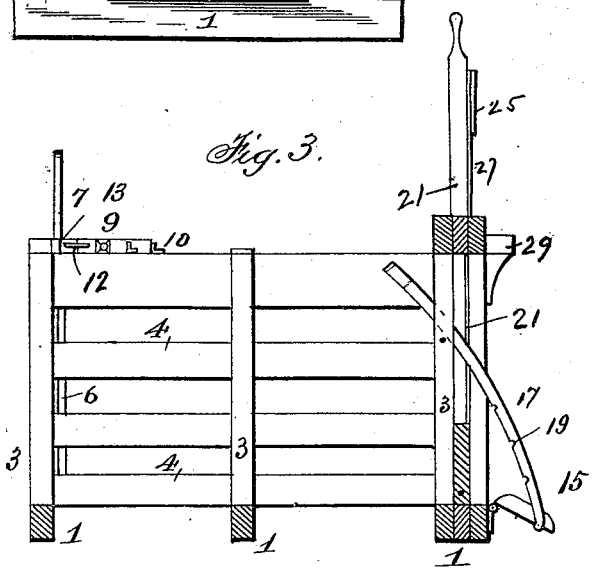
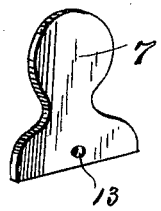
Witnesses.
F. L. Ourand.
Inventors
Martin Runnells
Wm. W. Pratt,
by Saun Baggu & Co.
Attorneys.

UNITED STATES PATENT OFFICE.

MARLIN RUNNELLS AND WILLIAM W. PRATT, OF HAMPTON, IOWA.

HOG-RINGING TRAP.

SPECIFICATION forming part of Letters Patent No. 581,175, dated April 20, 1897.

Application filed May 31, 1895. Serial No. 551,307. (No model.)

*To all whom it may concern:*

Be it known that we, MARLIN RUNNELLS and WILLIAM W. PRATT, citizens of the United States, residing at Hampton, in the county of Franklin and State of Iowa, have invented a new and useful Hog-Ringing Trap, of which the following is a specification.

Our invention relates to traps or cages for holding hogs and other animals while rings are being inserted in their noses, and its object is to provide an improved construction of the same by which a hog may be securely held, without injury, during the ringing operation and readily released when the operation is completed.

The invention consists in the novel construction and combination of parts hereinafter fully described and claimed.

In the accompanying drawings, Figure 1 is a front elevation of a trap or cage constructed in accordance with our invention. Fig. 2 is a rear elevation. Fig. 3 is a side elevation. Fig. 4 is a plan view. Fig. 5 is a detail view of the gate.

In the said drawings the reference-numeral 1 designates a series of base-beams, to which is secured the bottom or floor 2. Near each end these beams are provided with uprights 3, to which are secured horizontal side slats 4, constituting an open-top and open-end box, forming the trap or cage for the animal. The end uprights are braced by means of inclined bars 5, and at the rear the box is provided with a vertically-movable gate 6 and having a handle 7 at its upper end.

In front of this gate and pivoted to a bracket 8, secured to one of the top side slats, is a lever 9, which extends across the box or cage and passes between a guide 10 and the opposite side rail to which said guide is secured. The said lever is provided with a pin 12, which engages with a hole 13 in the gate when the latter is closed to hold it in place and with a hole 14 near the lower end of the gate to hold it in position when elevated to admit an animal to the box or gage.

Hinged to the front base-beam is a downwardly-opening clamp or apron 15, having a central concave recess 15ª and provided at one end with an arm 16, to which is pivoted a bar 17 for opening and closing the clamp. This bar passes between a guide 18 and one of the standards and is formed with a number of notches 19, adapted to engage with a pin 20 for holding the bar in position. Pivoted to said front base-beam at the center thereof is a vertical lever 21, having a wing 23 at one side. This lever passes and works between two horizontal bars 24 at the front of the cage, and is provided with a guide 25 and a pin 26. The numeral 27 designates a bar pivoted to one of the bars 24, and is provided with a number of notches 28, with which the pin 26 engages to hold the lever in position.

The operation is as follows: The apron or clamp is closed or turned up in front of the cage and the gate at the rear opened. The lever or stanchion 21 will now be in a vertical position, as shown by the full lines, Fig. 1, forming an opening between the side of the lever opposite the wing and the side of the box or trap. The animal is driven into the cage and the gate closed, and in endeavoring to escape the animal will pass its head through the opening at the front of the cage, when the lever is turned as shown in dotted lines, Fig. 1, thus firmly securing it. When the ringing operation is completed, the clamp or apron is dropped, allowing the animal to escape.

We claim—

1. In a hog-ringing apparatus, the combination with the open-ended box, the sliding gate at the rear thereof, and means for locking it when closed and holding it in position when opened, of the downwardly-opening apron or clamp, hinged to the front of the box and formed with a semicircular recess at its upper edge, the operating-bar connected therewith for opening and closing the same, and the lever pivoted to the front of the box, provided with a wing at one side, and means for holding such lever in position substantially as described.

2. In a hog-ringing apparatus, the combination with the open-ended box, the vertically-movable gate at the rear thereof, having holes near the upper and lower ends, the transverse lever pivoted to the box, the pin secured thereto adapted to engage with said holes and the guides for said lever, of the downwardly-opening clamp or apron hinged to the front of the box, having a semicircular recess in its upper edge, the arm secured thereto, the notched bar, the pin with which said notches are adapted to engage the vertical lever pivoted to the box provided with a wing at one side, the pivoted notched bar, the guide and the pin, substantially as described.

MARLIN RUNNELLS.
WM. W. PRATT.

Witnesses:
J. N. MALLOW,
WM. F. KELLEY.